(12) United States Patent
Hiramatsu (10) Patent No.: US 8,237,993 B2
(45) Date of Patent: Aug. 7, 2012

(54) APPARATUS AND METHOD FOR IMAGE PROCESSING OF GROUND PATTERN

(75) Inventor: Naoko Hiramatsu, Kyoto (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 50 days.

(21) Appl. No.: 12/415,397

(22) Filed: Mar. 31, 2009

(65) Prior Publication Data
US 2009/0190174 A1 Jul. 30, 2009

Related U.S. Application Data

(62) Division of application No. 11/019,192, filed on Dec. 23, 2004.

(30) Foreign Application Priority Data

Oct. 19, 2004 (JP) ................. 2004-304480

(51) Int. Cl.
*H04N 1/04* (2006.01)
*G06K 9/00* (2006.01)
*G06F 3/012* (2006.01)

(52) U.S. Cl. .......... 358/3.28; 358/1.15; 358/1.14; 358/1.13; 358/1.1; 358/1.16; 358/3.22; 358/3.23; 358/3.27; 358/504; 358/538; 358/540; 358/448; 358/453; 358/465; 358/466; 382/181; 382/218

(58) Field of Classification Search .............. 382/100, 382/317, 309, 366, 181, 218; 358/1.11–1.18, 358/3.28; 705/51
See application file for complete search history.

(56) References Cited

U.S. PATENT DOCUMENTS

| 5,390,003 | A | * | 2/1995 | Yamaguchi et al. | ......... 399/366 |
| 5,604,596 | A | * | 2/1997 | Ukai et al. | ............... 358/296 |
| 5,647,010 | A |   | 7/1997 | Okubo et al. | |
| 5,652,803 | A | * | 7/1997 | Tachikawa et al. | ...... 382/135 |
| 5,798,844 | A |   | 8/1998 | Sakano et al. | |
| 5,909,539 | A |   | 6/1999 | Chikauchi | |
| 6,298,150 | B1 |  | 10/2001 | Sonoda et al. | |

(Continued)

FOREIGN PATENT DOCUMENTS

EP   1 048 987 A2   11/2000

(Continued)

OTHER PUBLICATIONS

Office Action dated Mar. 30, 2009 issued in U.S. Appl. No. 11/019,192.

(Continued)

*Primary Examiner* — Twyler Haskins
*Assistant Examiner* — Chad Dickerson
(74) *Attorney, Agent, or Firm* — Buchanan Ingersoll & Rooney PC (57) ABSTRACT

In order to prevent illegal copying more effectively in an image forming apparatus, when a specified ground pattern for preventing copying is detected in input image data, the detected ground pattern is emphasized in the image data. Alternatively, information for detecting the specified ground pattern is stored in a storage device, in order to detect the ground pattern with the stored information. When the ground pattern is not detected, a ground region in the image data is analyzed further to determine whether a different ground pattern exits or not. When a ground pattern is detected, information for detecting the ground pattern is stored in the storing device.

4 Claims, 10 Drawing Sheets

U.S. PATENT DOCUMENTS

| | | |
|---|---|---|
| 6,698,150 B1 | 3/2004 | DiLorenzo |
| 6,760,464 B2 | 7/2004 | Brunk |
| 7,002,709 B1 | 2/2006 | Terada et al. |
| 7,123,369 B2 | 10/2006 | Hiramatsu et al. |
| 7,139,087 B2 | 11/2006 | Hayashi |
| 7,222,235 B1 | 5/2007 | Mitsui |
| 7,450,895 B2 | 11/2008 | Oomura et al. |
| 2003/0179412 A1 | 9/2003 | Matsunoshita |
| 2003/0210803 A1 | 11/2003 | Kaneda |
| 2004/0184065 A1 | 9/2004 | Guan et al. |
| 2005/0058476 A1 | 3/2005 | Murakami |
| 2005/0078331 A1 | 4/2005 | Guan et al. |

FOREIGN PATENT DOCUMENTS

| | | |
|---|---|---|
| JP | 06-125459 | 5/1994 |
| JP | 07-036317 | 2/1995 |
| JP | 07-123254 | 5/1995 |
| JP | 07-231384 | 8/1995 |
| JP | 09-164739 | 6/1997 |
| JP | 2000-316084 A | 11/2000 |
| JP | 2001-086330 | 3/2001 |
| JP | 2001-197297 | 7/2001 |
| JP | 2001-203885 A | 7/2001 |

OTHER PUBLICATIONS

Office Action dated Apr. 30, 2010 issued in U.S. Appl. No. 11/019,192.

Office Action issued in related U.S. Appl. No. 11/019,192 on Nov. 10, 2011.

Office Action issued in related U.S. Appl. No. 13/088,953 on Dec. 12, 2011.

Office Action issued in copending U.S. Appl. No. 11/019,192 on Nov. 10, 2011.

Office Action issued in related U.S. Appl. No. 13/088,953 on May 27, 2011.

* cited by examiner

APPARATUS AND METHOD FOR IMAGE PROCESSING OF GROUND PATTERN

This application is based on application No. 2004-304480 filed in Japan, the contents of which are hereby incorporated by reference.

BACKGROUND OF THE INVENTION

1. Field of the Invention

The present invention relates to prevention of reproduction of a document including a ground pattern added for preventing a reproduction thereof.

2. Description of the Related Art

Recently, electrophotographic copying machines have been spread widely, and characters or an image printed on a sheet of paper or the like can easily be copied by any person by using such a copying machine. Image processing technology and image forming technology are also improved significantly. Then, especially, by using a state of the art digital color copying machine (MFP), a copy difficult to be distinguished from an original can be created easily. Therefore, it is important to prevent forgery, falsification or illegal copying of prints of important documents.

In one of the measures for preventing forgery, falsification and false copy of a print, a ground pattern for preventing or deterring copying is added to an image of a document when it is printed by a printer having a function for outputting the ground pattern. An image of the document is read by the scanner when the document is copied, and when the ground pattern is detected in the image data, copying of the image is prohibited (for example, refer to Japanese Patent laid open Publication No. 2004-201069). The precision of the detection of the ground pattern depends on the resolution of the copying machine, a threshold value used for removing a ground image from an image and the like. Therefore, the ground pattern for preventing copying can not necessarily be detected accurately, and the precision of the detection depends on a combination of the performance of a copying machine and the characteristics of a ground pattern characteristic. Thus, the effect of the ground pattern for preventing copying may not be sufficient. Moreover, in order to prevent illegal copying or the like, the ground pattern should be emphasized visually when an original including the ground pattern is copied. Therefore, it is necessary to control the emphasis processing properly.

In another technique for improving the effect of the copy preventive ground pattern, a watermark is printed together with the copy preventive ground pattern. When detecting the water mark on copying, a measure for copy prevention is activated. In this technique, the measure can be activated without depending on the characteristic of the copying machine. However, a sufficient effect is not assured for a document for which the watermark technique is not introduced.

A ground of an image influences read of the image. Therefore, in order to eliminate the influence of the ground, a print detector disclosed in Japanese Patent laid open Publication No. 2002-15304 surely reads the print printed on the ground by controlling the threshold value for detecting the print according to the density of the ground. This is a technique for changing an image processing parameter for reading characters according to the density of the ground.

However, even if an original is printed by including a copy preventive ground pattern in the image, it may not be possible so far to accurately detect the ground pattern in the original, because the detection performance depends on a combination of the detection performance of an image forming apparatus such as a copying machine or a printer and a feature of the ground pattern. Particularly, it is to be noted that originals to be read are produced by various image forming apparatuses having various printing characteristics. Therefore, it is desirable to ensure that copy preventive ground patterns output from various image forming apparatuses can serve to prevent illegal copy or the like to the maximum. Then a large amount of documents created previously can be used positively and effectively.

SUMMARY OF THE INVENTION

It is an object of the present invention to make it possible to effectively prevent copying with a copying machine for a document including a ground pattern added to prevent copying.

In one aspect of the invention, a specified ground pattern for preventing copying is detected in input image data, and the detected ground pattern is emphasized in the image data.

In another aspect of the invention, input image data is sent to an external device. When a ground pattern is detected in the image data, information for detecting a ground pattern in the image data is received and stored in a storage device.

It is an advantage of the invention that ground pattern for preventing copying can be emphasized in a copy in order to enhance the copy prevention effect of the ground pattern.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Referring now to the drawings, wherein like reference characters designate like or corresponding parts throughout the several views, embodiments of the present invention will be described below.

Figure 1:
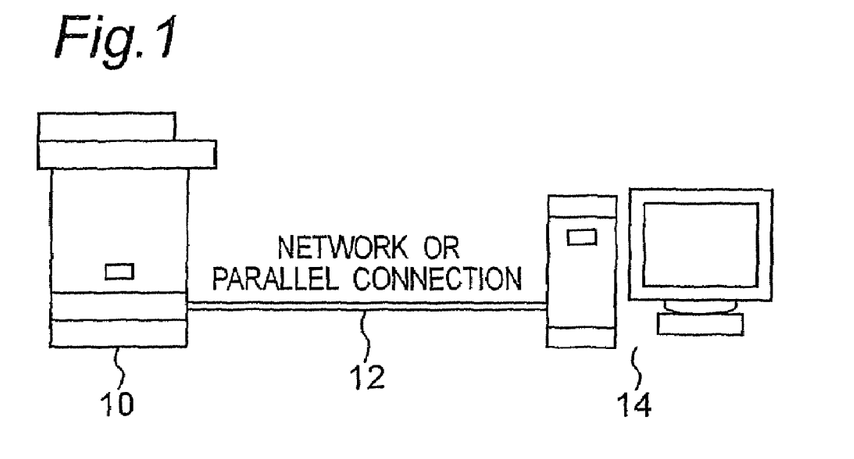
FIG. 1 is an illustration showing a system including a multi-functional peripheral and a personal computer.

In the case of the system shown in FIG. 1, a multi-functional peripheral (MFP) 10 functioning as a printer, scanner, or a copying machine is connected to an information processing terminal 14 such as a computer through a network such as a local area network or in a parallel connection 12. A user of the information processing terminal 14 can instruct image reading and printing to the MFP 10, and the MFP 10 performs a processing according to the instruction.

Figure 2:
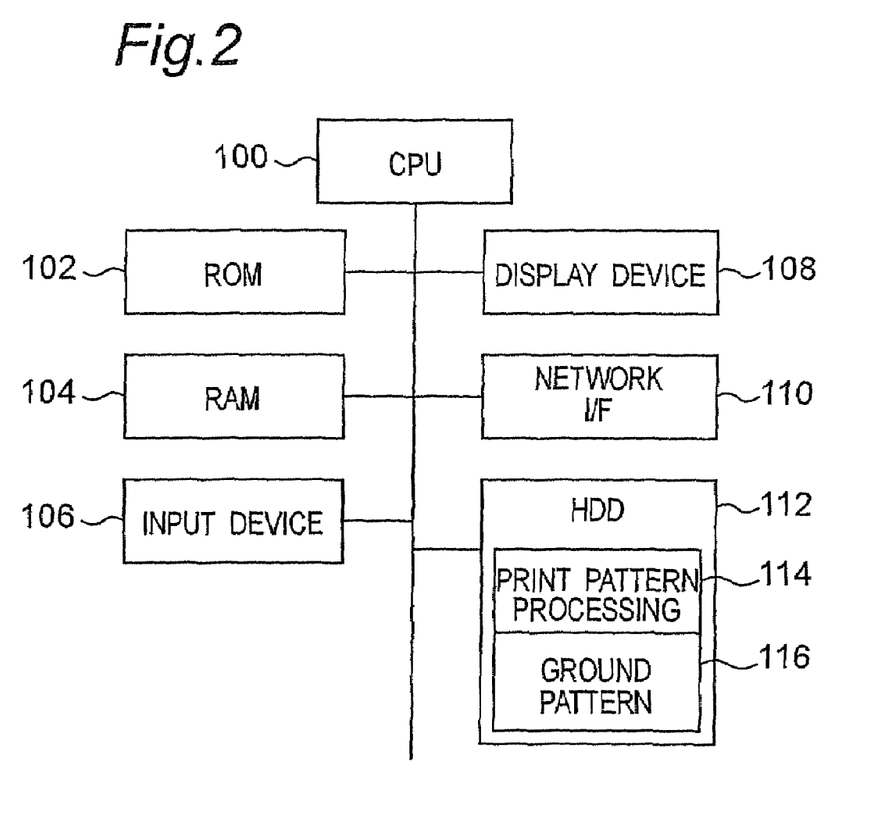
FIG. 2 is a block diagram of the personal computer.

FIG. 2 shows a configuration of the personal computer (PC) as an example of the information processing terminal 14. The PC has a central processing unit (CPU) 100 for executing programs. The CPU 100 is connected to a read-only memory (ROM) 102 for storing programs and data, a random access memory (RAM) 104 serving as a work area, an input device 106 such as a keyboard and a mouse to be operated by a user, a display device 108 for displaying information on a screen, a network interface 110 to be connected to the network, and a hard disk drive 112 serving as a storage device. This configuration is similar to that of a conventional personal computer.

Figure 3:
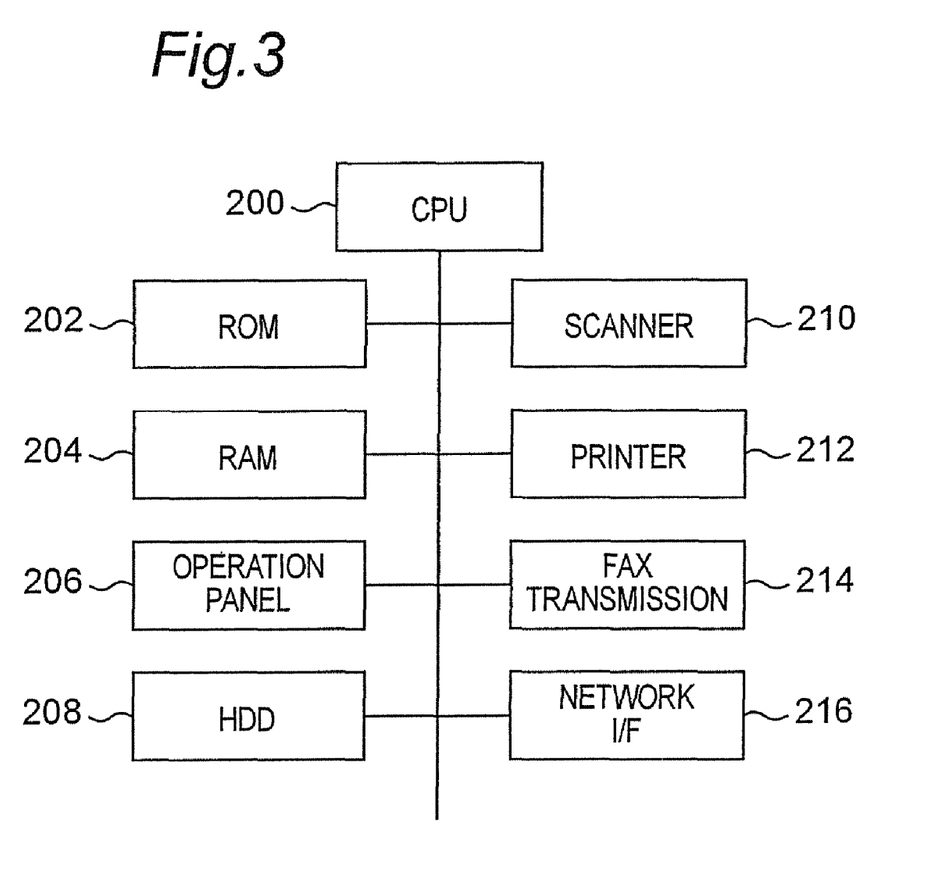
FIG. 3 is a block diagram of the multi-functional peripheral.

FIG. 3 shows a configuration of the MFP 10 wherein a central processing unit (CPU) 200 for controlling the entire device is connected a read-only memory (ROM) 202, a random access memory (RAM) 204, an operation panel 206, a hard disk drive 208, and a network interface 216. Moreover, the CPU 200 is connected to a scanner 210 for reading an image, a printer 212 for printing, and a facsimile unit 214 for FAX transmission.

Figure 4:
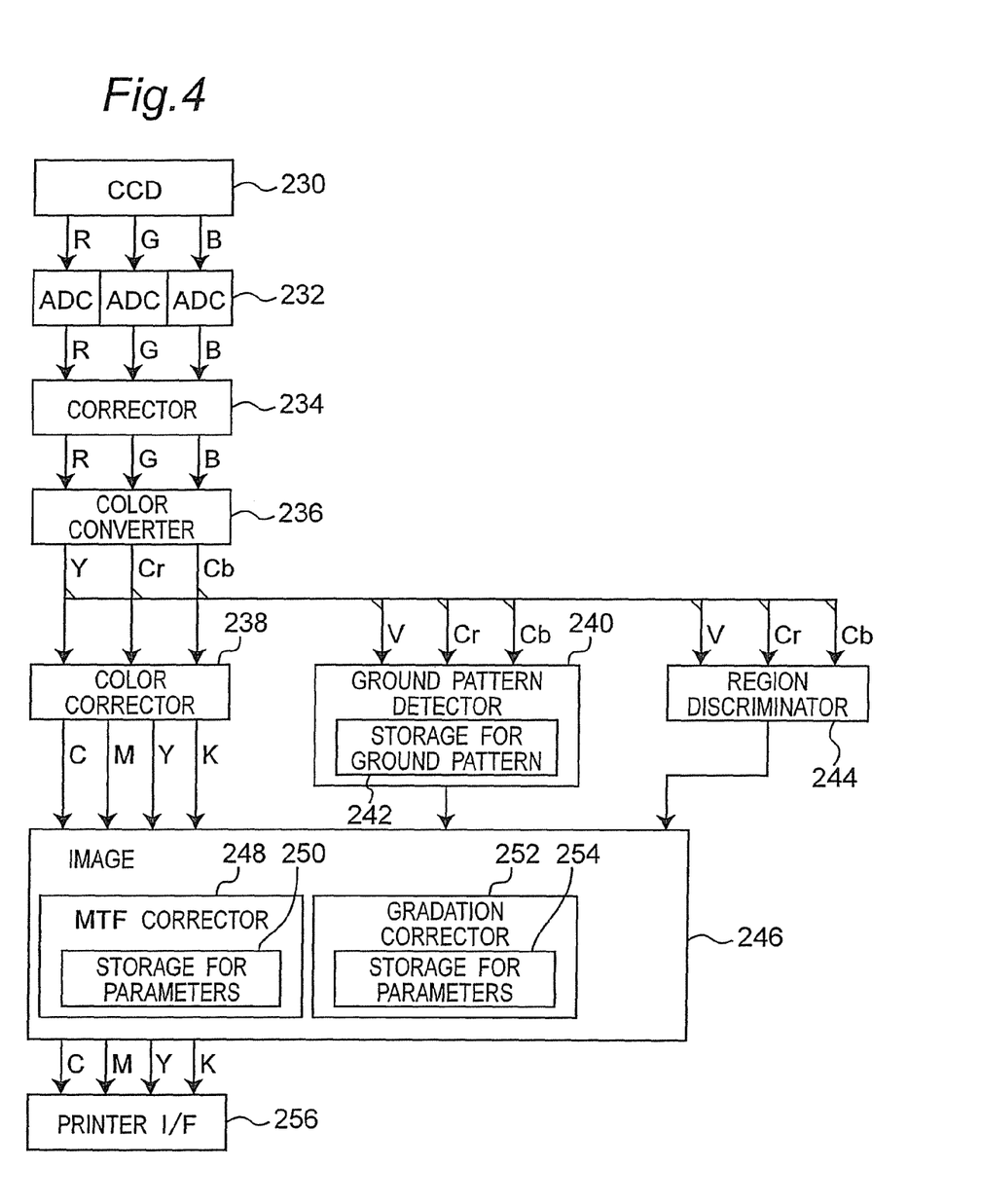
FIG. 4 is a block diagram of an image processing block.

FIG. 4 shows an image processing block in the scanner 210 in the MFP. In the image processing block, a charge-coupled device (CCD) sensor 230 reads an image of an object in colors of R, G and B, and an analog-to-digital (A/D) converter 232 converts the RGB analog image data read by the CCD sensor 230 to digital data. Further, a correction unit 234 performs shading correction, chromatic aberration correction and the like for the digital data R, G and B, and if necessary changes the magnification of the image or moves the image. A color converter 236 converts the input image data expressed in RGB color space to image data expressed in VCrCb color space. Then, a color corrector 238 converts and corrects the image data in the VCrCb color space, to output image data (CMYK data) expressed in CMYK color space required for printing. An region discriminator 244 discriminates areas such as a photograph area, a character area and the like in the image. A ground pattern detector 240 detects a ground pattern for preventing or deterring copying (or a copy preventive ground pattern) by using ground pattern data stored in a storage device 242. Then, in an image corrector 246, a MTF corrector 248 performs MTF correction for the CMYK data depending on the region discrimination result by the region discriminator 244. Further, when a ground pattern is detected, the MTF corrector 248 performs MTF correction by using the parameters stored in a storage device 250. Further, a gradation corrector 252 performs gradation correction by using the parameters stored in another storage device 254. A printer interface 256 transmits the CMYK data subjected to the MTF corrections to the printer 212.

Next, a first embodiment of the invention is explained, wherein when a copy preventive ground pattern is detected in image data of an original, the ground pattern is emphasized so as to make it noticeable. Information for detecting a copy preventive ground pattern and image processing information for emphasizing the ground pattern have been registered. Then, the detected ground pattern is emphasized to make it noticeable in accordance with a result of the detection of the ground pattern. Thus, it is always possible to detect a ground pattern output from the various copying machines and printers. Further, the emphasis can be optimized so as to make the ground pattern noticeable, so as to enhance the copy preventive effect of a print.

A feature of a ground pattern can be defined by an arrangement of dots, lines, and a pattern (for example, refer to Japanese Patent laid open Publication No. 2004-201069). When a ground pattern consists of dots, its feature can be given by data on arrangement of dots, dot density, dot diameter, dot color and the like. When a ground pattern consists of straight lines, a feature of the ground pattern can be represented by the width of each line and the density of the lines.

In an example described below, a copy preventive ground pattern is assumed to have a combination of a plurality of patterns having resolutions (number of lines) different from each other. In an example shown in FIG. 5, the copy preventive ground pattern is printed in a ground region (as schematically shown with dots in FIG. 5) in an image shown at the left side. As shown enlarged at the right side in FIG. 5, this ground pattern consists of a combination of a first pattern of narrow lines having a higher resolution (number of lines) and a second pattern of dots having a lower resolution (number of lines). When the scanner 210 reads the ground pattern, the narrow line pattern is detected as light gray lines depending on the resolution of the scanner 210, while the pattern of large dots is obtained as discrete black points. When the read data is printed, the light gray points are removed in the print by the ground remove function of the printer 212, while the pattern of black points remains. The remaining pattern of black points shows, for example, a string of characters printed hidden in the ground pattern, but appearing emphasized in a copy. In the ground pattern emphasis explained above, a trouble due to erroneous recognition of a ground pattern will not occur because a normal output image can be produced even if the emphasis is performed erroneously to an image not including the ground pattern.

Figure 6:
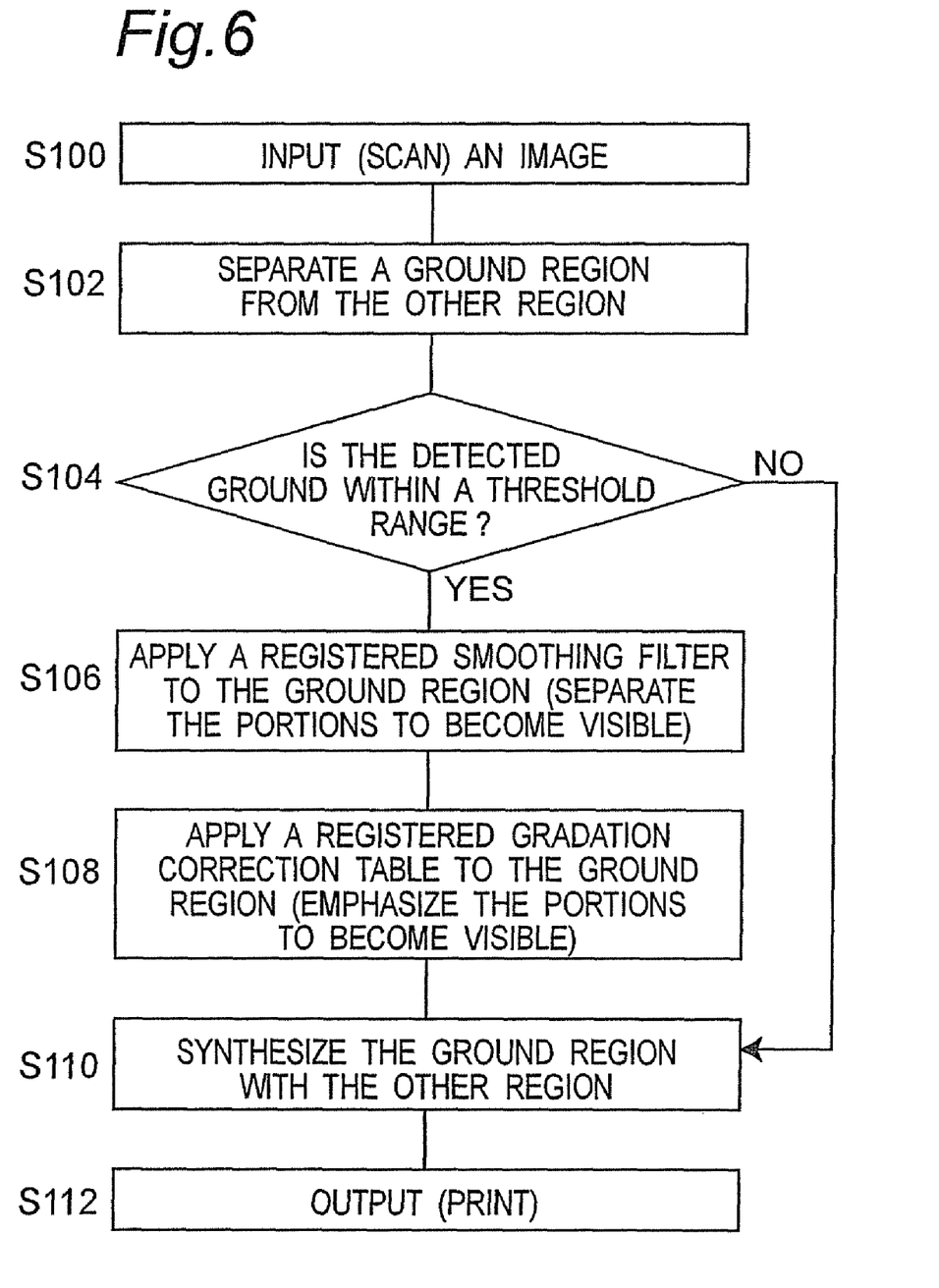
FIG. 6 is a flowchart of ground pattern processing in the MFP of a first embodiment.
Figure 7:
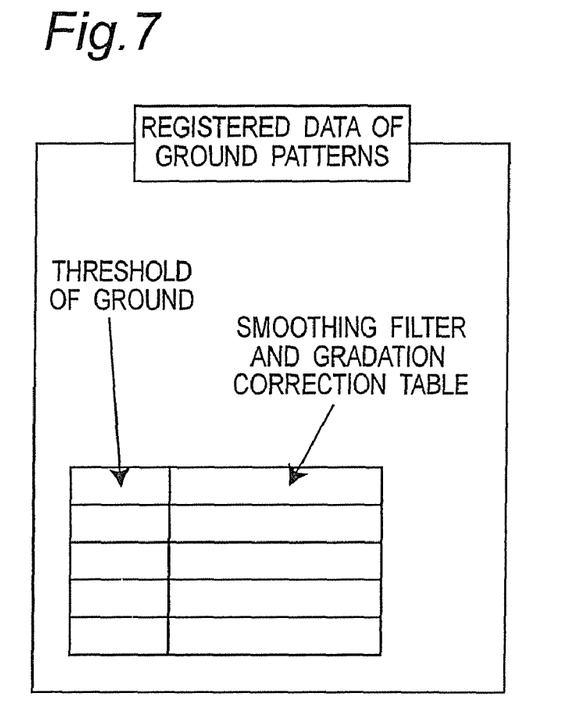
FIG. 7 is a diagram of a table of registered ground data.
Figure 8:
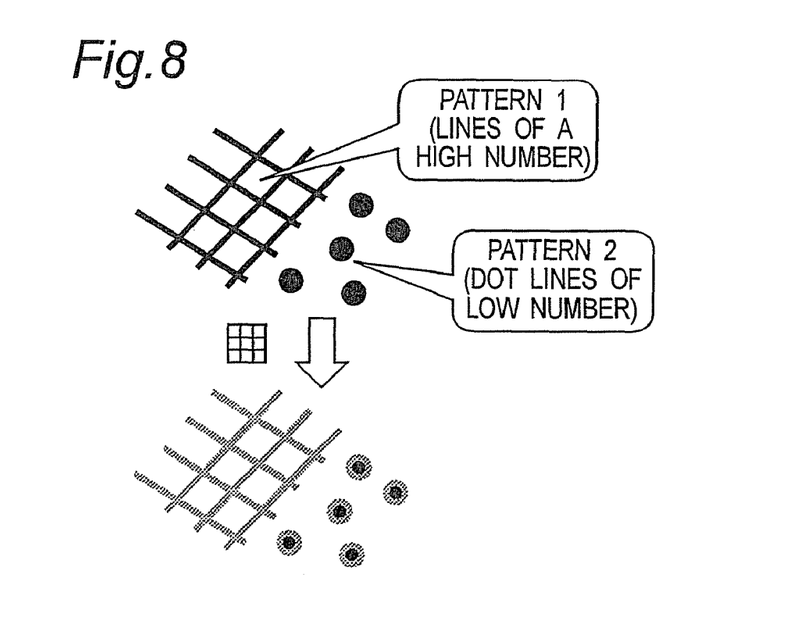
FIG. 8 is a diagram of parameters for emphasizing a ground pattern and a smoothing filter.
Figure 9:
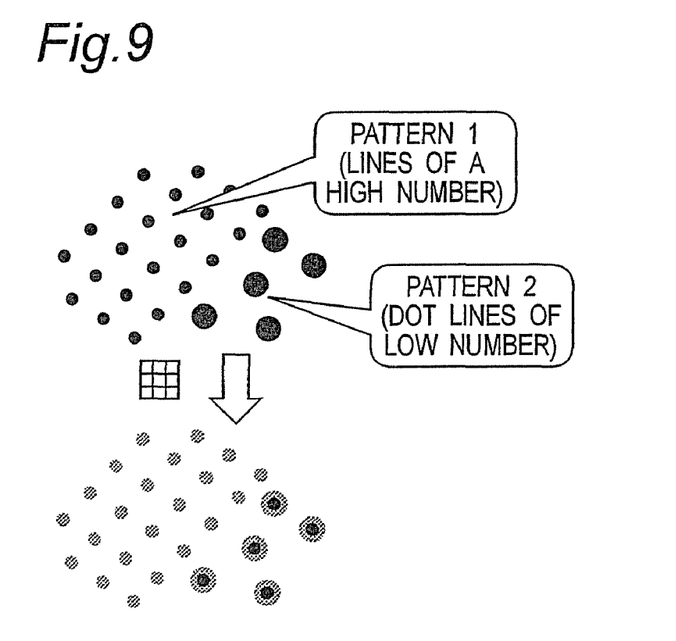
FIG. 9 is a diagram of an example of a ground pattern emphasizing parameter and a smoothing filter.

FIG. 6 shows a flow of the ground pattern processing of the first embodiment. In the image processing block in the scanner 210, the ground pattern detector 240 receives image data (S100) and separates a ground region (or a background region) from the other including characters and photographs in the image data. Further, the ground pattern detector 240 analyzes the separated ground region to determine whether a ground pattern in the ground region is already registered or not (S104). In this embodiment, it is confirmed by using the color information on the color of the ground whether the detected ground pattern is registered or not. First, the average value (RGB) of color information of the ground color is calculated, and the RGB value is converted to a Lab or Luv value. The obtained Lab or Luv value is compared with the Lab or Luv value of the previously registered ground data to determine whether the obtained Lab or Luv value is within a threshold value range. (A method for detecting the ground pattern is not restricted to the above method. It is also possible to detect the ground pattern by using a comparison of a shape of a histogram of data of the ground or a comparison of image data of the ground pattern after frequency conversion thereof. A method disclosed in Japanese Patent laid open Publication No. 2004-201069 can also be used.) When the obtained Lab or Luv value is decided within the threshold value range, the Lab or Luv value is considered to agree with the registered ground pattern data. Then, the image data of the ground is processed by using the parameters for emphasizing the ground pattern together with the registered ground data. As shown in FIG. 7, the registered ground pattern data includes a ground threshold value, a smoothing filter and a gradation correcting table. In a following example of emphasis processing, the registered smoothing filter is first applied in the ground processing (S106). In examples shown in FIGS. 8 and 9, a smoothing filter shown in the middle of FIG. 8 or 9 is set to a size larger than a line width but smaller than a dot size in the samples. Therefore, a fine pattern is gradated, while a coarse pattern is left. When the grounds shown at the upper sides in FIGS. 8 and 9 are processed by the smoothing filters, a gradation difference occurs between a region in which a fine pattern is printed and another region in which a coarse pattern is printed, as shown at lower sides in FIGS. 8 and 9. Thus large patterns are left and separated.

Figure 10:
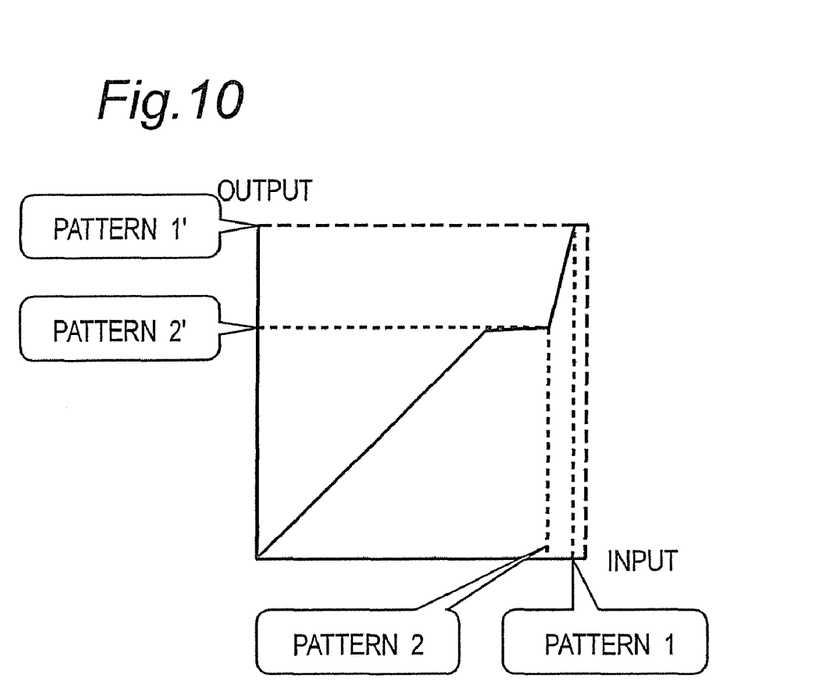
FIG. 10 is a diagram of another example of a ground pattern emphasizing parameter and a smoothing filter.

Thereafter, the registered gradation correcting table is applied in order to emphasize the gradation difference generated at step S106 (S108). FIG. 10 shows an example of the gradation correcting table on a relationship between input and output signals. In the example shown in FIG. 10, colors shown as patterns 1 and 2 are converted to colors shown as patterns 1' and 2', respectively. However, the color of the pattern 2' is considerably lighter than that of the pattern 2. Thus, the color difference between a region of a fine pattern and that of a large pattern is emphasized. Thus, the pattern separated by the step S106 is emphasized.

Finally, the image data for the ground region emphasized by the above-mentioned processing is synthesized with the data in the other regions (character region, and photograph region and the like) other than the ground region (S110). The synthesized data is output for printing (S112). Thus, hidden characters in the ground are emphasized and output so as to be clearly recognized by naked eyes.

Figure 5:
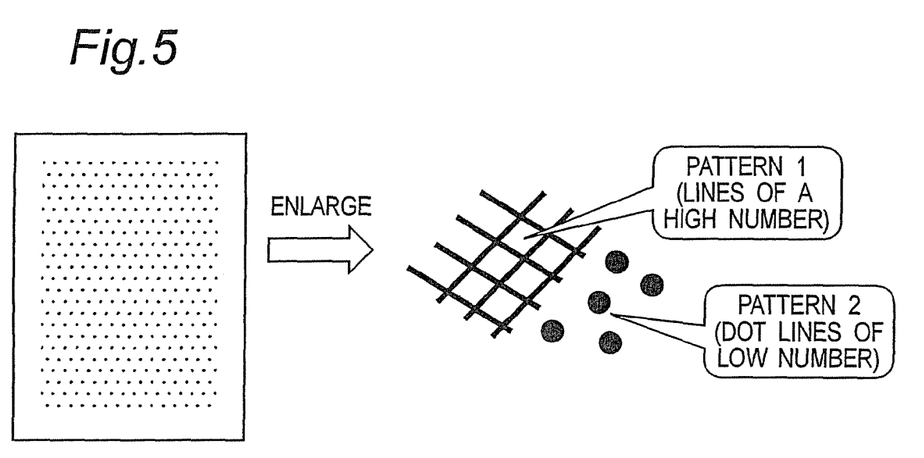
FIG. 5 is a diagram of a copy preventive ground pattern.

In the above ground pattern processing, when the read resolution of the scanner 210 is high, even the fine patterns in FIG. 5 are accurately obtained in the unit of dot. Therefore, a difference in brightness due to the difference between the patterns does not appear. On the other hand, if the ground remove function is not active, the hidden characters are not easily recognized because the fine patterns are not removed. Therefore, in order to prevent copying to the maximum by using copy preventive ground patterns generated by various image forming apparatuses, it is preferable to set information on the ground pattern detection and the image processing parameters in accordance with a copy preventive ground pattern present in a print. Then the above-mentioned copy prevention technique can be adapted to the performance of various multi-functional peripherals and printers. In the following embodiments, the ground pattern is recognized in the ground, and the ground pattern detection information and the image processing parameters are registered in the multi-functional peripheral 10.

In a second embodiment, when an unregistered ground pattern is recognized in the ground, it is registered as a copy preventive ground pattern. When a user presses a ground pattern register key in the operation panel 206 of the multi-functional peripheral (MFP) 10, an information processing terminal 14 connected to the MFP 10 analyzes the ground image, recognizes a ground pattern therein, and registers the ground pattern as a copy preventive ground pattern. As explained above on the first embodiment, the MFP 10 can perform the separation of the ground, the detection of ground color, and the emphasis of ground pattern. In this embodiment, the information processing terminal 14 stores a ground pattern program 114 and ground patterns 116 in the hard disk drive 112, analyzes the ground to detect a ground pattern in the ground, calculates ground pattern emphasizing parameters for the new ground pattern when detected, registers the new ground pattern, and notifies the new ground pattern to the MFP 10.

Figure 11:
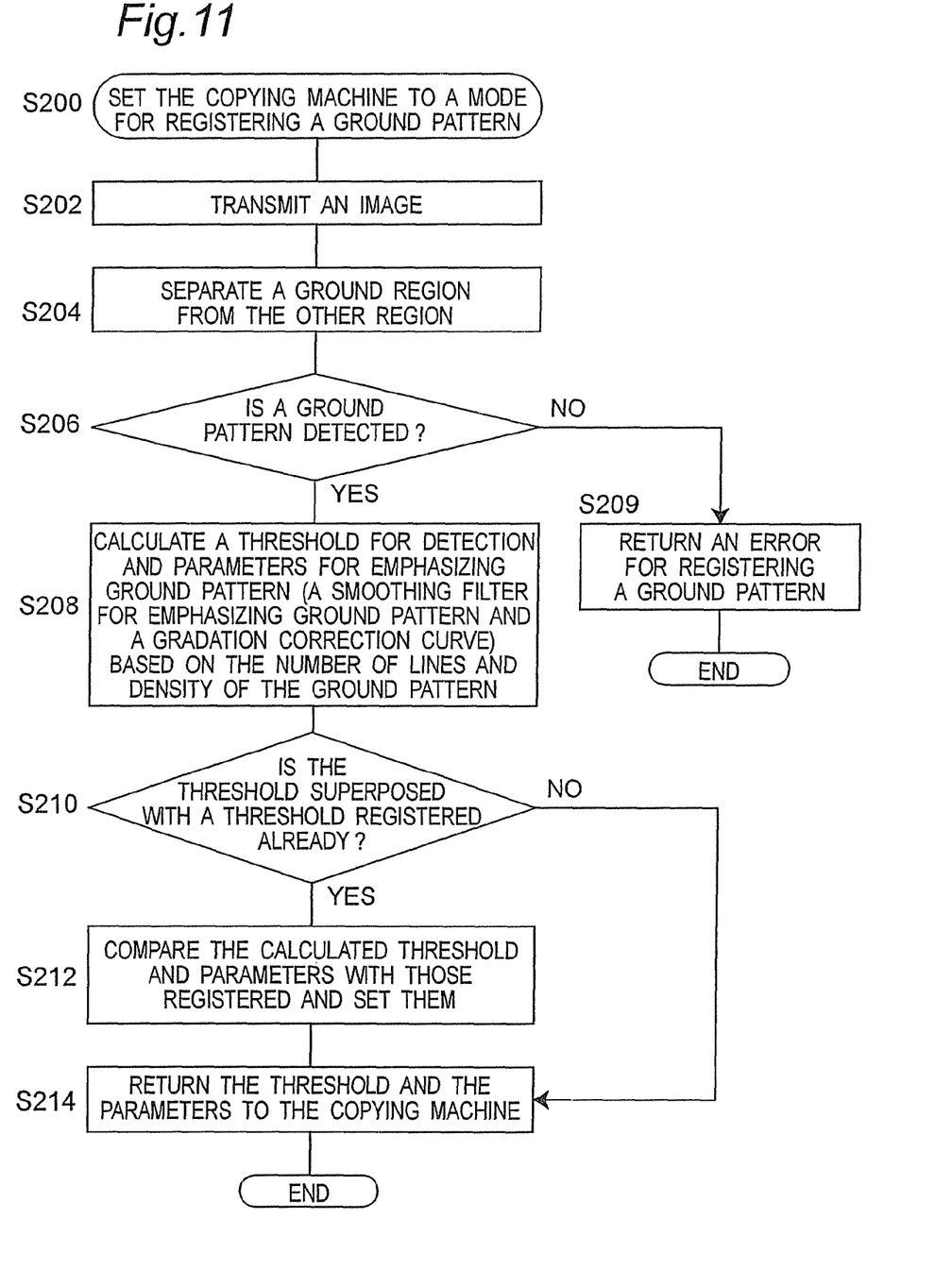
FIG. 11 is a flowchart for the ground pattern processing in an information processing terminal of a second embodiment.

FIG. 11 shows a flowchart of the ground pattern detection processing 114 of the information processing terminal 14. The operation panel 206 has a ground pattern register mode key (not shown) in the operation panel 206. When the ground pattern register key is pressed, the MFP 10 is set to the ground pattern register mode and informs the information processing terminal 14 that the MFP 10 is set to the mode. When it is communicated from the MFP 10 that the MFP 10 is set to the ground pattern register mode (S200), image data is transferred and received from the MFP 10 (S202), and the ground region (background region) is separated from the other region in the image data (S204). Then, the separated ground region is analyzed to determine whether a ground pattern is detected (S206). When a ground pattern is not detected, a ground pattern register error is returned to the MFP 10 (S209). When a ground pattern is detected, a threshold value (ground color) for detection and parameters used for ground pattern emphasis (for example, a smoothing filter and a gradation correcting curve) are calculated based on the number of lines and the density of the ground patterns (S208). Moreover, it is determined whether the obtained detecting threshold value overlaps with the threshold value range for the already registered copy preventive ground patterns (S210). When the threshold value overlaps with the range, a new detecting threshold value and new ground pattern emphasizing parameters are set by comparing the registered ground pattern parameters (S212). Moreover, the detecting threshold value of the detected ground pattern and the ground pattern emphasizing parameters are returned to the MFP 10 (S214). When the MFP 10 registers the information, it can be used in the subsequent print processing.

In this embodiment, it is determined at step S206 whether the ground pattern is detected. When the ground pattern is not detected, a ground pattern register error is returned to the MFP 10 in the S209. Alternatively, the ground is separated from the transferred image data and parameters obtained by analyzing the ground region are registered as the ground pattern detecting threshold value and the ground pattern emphasizing parameters.

In this embodiment, the ground pattern detecting threshold value and the ground pattern emphasizing parameters are calculated automatically by the information processing terminal 14. Alternatively, a user can set various detecting threshold values while viewing the image displayed on the display device 108 and manually set a threshold value among them detected most accurately. Further, a user can set various ground pattern emphasizing parameters to perform image processing, and manually set the parameter for which the emphasis processing is executed best. Then, threshold value and the parameters are returned to and registered in the MFP 10.

Next, a third embodiment is explained. In the third embodiment, when an unregistered ground pattern is found transferred to the information processing terminal 14, and the ground image data is automatically analyzed at the information processing terminal 14, and a copy preventive ground pattern is automatically registered when found.

Figure 12:
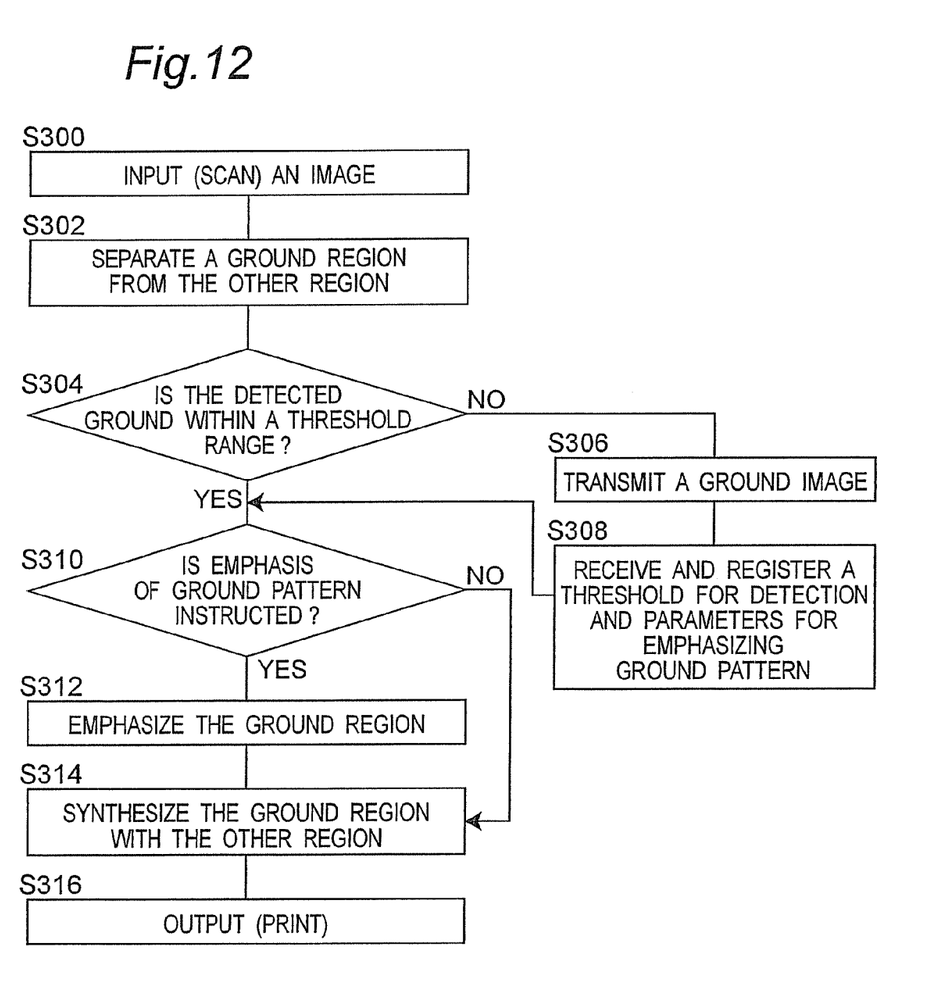
FIG. 12 is a flowchart for print processing in a copying machine of a third embodiment.
Figure 13:
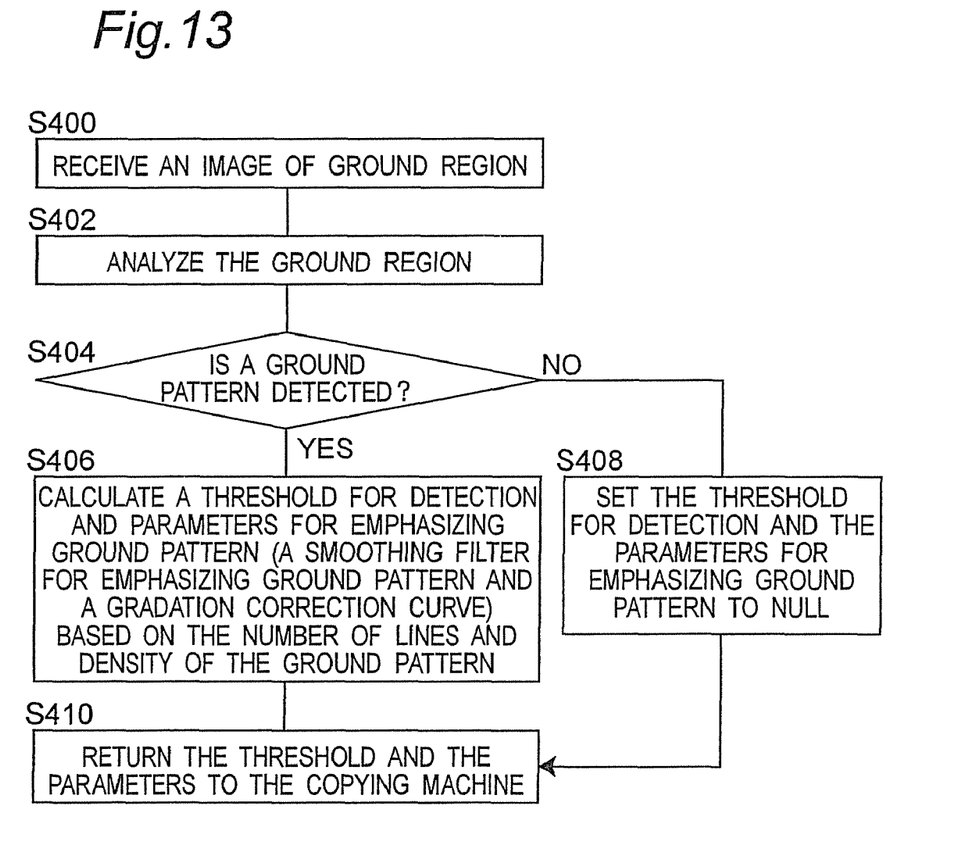
FIG. 13 is a flowchart for the ground pattern detection processing in the information processing terminal of the third embodiment.

FIGS. 12 and 13 show flows of the ground pattern processing in the third embodiment. In the image processing block in the scanner 10 of the MFP 10, as shown in FIG. 12, an image is received (S300), and the input image is separated into the background region (ground region) and the other regions (S302). Then it is determined whether the detected ground is within a registered threshold value range or not (S304). When it is determined that the detected ground is within the registered threshold value range, it is determined whether the ground pattern emphasis is instructed or not (S310). When the ground pattern emphasis processing is instructed, the emphasis is performed in the ground region (S312). Then, an image obtained by synthesizing the ground region with the other regions is formed (S314). Then, the image is output to the printer 214 for printing (S316).

When it is determined at step S304 that the detected ground is not within the registered range of threshold value, that is, when the ground is determined an unregistered ground pattern, the ground image is transferred to the information processing terminal 14 (S306).

The ground pattern processing 114 at the information processing terminal shown in FIG. 13 is explained here. In the information processing terminal 14, the transferred image is received (S400), the ground image data in the transferred image is analyzed (S402), and it is determined whether a ground pattern is detected or not (S404). When the ground pattern is detected, the threshold value for detection and the parameters for emphasizing the ground pattern (a smoothing filter and a gradation correcting curve) are calculated based on the number of the lines and the density of the ground pattern (S406). However, when the ground pattern is not detected, the threshold value for detection and the ground pattern emphasizing parameters are set to NULL (S408). Moreover, the threshold value for detection and the ground pattern emphasizing parameters such as the smoothing filter and the gradation correcting curve are returned to the MFP (a copying machine) 10 (S410).

In the MFP 10, the received detecting threshold value and the ground pattern emphasizing parameters (for example, the smoothing filter and the gradation correcting curve) returned from the information processing terminal 14 are registered in the storage 242 for ground pattern and in the storages 250 and 254 for the parameters (S308). Then, the MFP 10 restarts the processing from the step S300 and continues the processing up to the S312 in accordance with the input image data stored in the storage device.

Advantages of the above-mentioned embodiments are explained here. The processing for editing the ground pattern is performed in accordance with a result of detection of the copy preventive ground pattern in the input image data. Moreover, an unregistered ground pattern can be detected in the image data in a ground region and can be registered. Therefore, the advantage for preventing copying is always obtained for ground patterns output from various copying machines and printers when the ground patterns are read by the scanner. Various ground patterns can be used for security in printing. It is possible to perform the emphasis in correspondence to the ground pattern in order to emphasize the ground pattern more effectively. The processing has a large advantage in an environment in which a lot of data provided with the ground patterns output in the past or a plurality of printers respectively having the ground pattern outputting function.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus comprising:
   an input device which inputs image data;
   a transmitter which transmits the input image data to an external device, wherein the external device calculates emphasizing parameters and a threshold value based on lines and density of a detected ground pattern within the input image data;
   a communication device for receiving the emphasizing parameters and the threshold value for detecting the ground pattern in the input image data from the external device wherein the received emphasizing parameters and threshold value were developed based on the input image data; and
   a storage device which stores the emphasizing parameters and the threshold value.

2. The image processing apparatus according to claim 1, wherein said communication device further receives and stores second emphasizing parameters and second threshold value used for processing the ground pattern.

3. The image processing apparatus according to claim 1, wherein the ground pattern is detected within the input image data based on the emphasizing parameters and the threshold value.

4. The image processing apparatus according to claim 1, further comprising a mode setter for setting a mode to the external device for analyzing the information used for detecting the ground pattern.

* * * * *